United States Patent [19]

Maier

[11] Patent Number: 4,539,881
[45] Date of Patent: Sep. 10, 1985

[54] GUIDE PLATE FOR A HAND POWER SAW

[76] Inventor: Peter Maier, Gerokstrasse 1, D-7311 Neidlingen, Fed. Rep. of Germany

[21] Appl. No.: 553,054

[22] Filed: Nov. 18, 1983

[30] Foreign Application Priority Data

Nov. 25, 1982 [DE] Fed. Rep. of Germany ....... 3243564

[51] Int. Cl.³ ............................................... B27B 9/04
[52] U.S. Cl. ......................................... 83/745; 30/374
[58] Field of Search ................ 30/371, 372, 373, 374; 33/42, 41 F; 83/745, 455

[56] References Cited

U.S. PATENT DOCUMENTS

| | | | |
|---|---|---|---|
| 3,830,130 | 8/1974 | Moore | 83/745 |
| 4,059,038 | 11/1977 | Rietema | 83/745 |
| 4,202,233 | 5/1980 | Larson | 83/745 |
| 4,381,103 | 4/1983 | Ferdinand | 83/745 |

Primary Examiner—Jimmy C. Peters
Attorney, Agent, or Firm—McGlew and Tuttle

[57] ABSTRACT

A guide plate for a hand power saw has a top side with a low coefficient of friction for functioning with a guide member on the power saw, whereas the other or lower side of the plate has a slip-proof facing material for resting on a workpiece to be cut with the saw. Furthermore near one of its long edges the guide plate has a guide ridge with guide faces thereon running in the direction of sawing. A main part of the guide plate is placed on the one side of this ridge while the part on the other side of it is in the form of a ledge that is in a single plane with the lower face of the guide plate on the other side of the ridge. The lower side of the guide ridge is in this plane or is higher up than this plane. On the side of the main part of the guide plate furthest from the ridge there is a guide lip running in the direction of sawing that rests on the workpiece to be cut. This guide lip is made of non-splitting, elastic material running out from the side of the guide plate edge furthest from the guide ridge and the outermost edge of the lip is designed to be used as a cut marker.

11 Claims, 4 Drawing Figures

GUIDE PLATE FOR A HAND POWER SAW

BACKGROUND OF THE INVENTION

The present invention relates to guide plates for hand power saws and more particularly to such a guide plate designed to be placed against the guide means of such a saw, and which has a top or saw side with a low coefficient of friction, and on the opposite side thereof an anti-slip or frictional support or work face and a guide ridge running in the length direction and having guide faces, said ridge being placed near or at the one lengthways edge of the plate.

DISCUSSION OF THE PRIOR ART

Known forms of such guide plates have been used particularly in connection with hand circular saws. Such a circular saw may have a guide means designed in the form of a support plate with a guide face stretching in the direction of sawing and designed for running on mating faces of the guide plate that is designed to be placed on the work and is separate from the housing of the saw. For stopping the guide plate slipping out of position on the work, the work face of the guide plate is in most cases coated with an anti-slip material; while on the other hand it is important for the guide means of the saw to be able to be pushed along on the top side of the guide plate freely, that is to say with a low degree of friction. Because in the case of the known guide plate, that generally has a long rectangular form with the guide ridge extending in a lengthways direction and parallel to the cutting edge, that is to the edge of the guide plate that is nearest the blade of the saw, the center of gravity of the saw is at a higher level than the guide plate, and the axis of turning of the saw is dependent upon the position of the guide ridge. A further point is that position of the axis of turning is as well dependent on the position of the guide ridge, same being at that position of the guide plate that is acted upon by the forces, acting in the round-the-ridge direction, caused by the hand circular saw. That is to say, it is a question of those forces that are able to be transmitted to the guide plate on moving and working the saw. It is more specially in the case of guide plates, whose guide ridges are able to be mechanically fixed and locked on the guide means of the saw, that any chance of swiveling of the hand power saw normal to the cut direction may be the cause of the guide plate being pulled clear of the workpiece so that for example only the work face of the guide ridge is kept on the work. This swiveling out of position of the guide plate is such that the distance from the cutting edge of the guide plate and the workpiece becomes greatest, this causing an undesired change in the cut angle of the saw blade in relation to the workpiece and in many cases the guide means of the saw may come off the guide ridge on the guide plate.

The saw blade is normally guided so as to be at some distance from the cutting edge of the guide plate so that there is some chance of the saw blade fouling the guide plate, which is as a rule made of aluminum, for example. The distance between the saw blade and the cutting edge is generally some millimeters so that the tolerances of different forms of hand power saws are taken into account as well. The presence of a gap between the saw blade and the cutting edge of the guide plate does however give an undesired effect on the cutting operation, more specially inasfar as any turning of the saw blade in a direction opposite to the direction of motion of the power saw may be responsible for damage to the top layer of the workpiece by tearing pieces of fiber or the like therefrom.

SHORT OUTLINE OF THE INVENTION

Taking into account this stage of development of the prior art, one purpose of the present invention is that of designing a guide plate of the sort noted that makes possible a high quality cutting operation.

A further purpose is that of designing a saw guide plate stopping damage to the workpiece and more specially the surface layer thereof.

An even further purpose of the invention is that of safeguarding the user against flying chips or shavings from the workpiece.

For effecting these and other purposes that will become clear to an expert on reading further parts of the present specification, the guide ridge is made with at least one ledge running out from the guide ridge in the opposite direction to the main body of the guide plate, the work face of the ledge being in a common plane with the workpiece or lower face of the main body of the guide plate, said common plane being further out from the work face of the guide ridge or being coplanar therewith, and on the side of the guide plate opposite to the guide ridge there is a guide lip of non-splitting elastic material (as for example hard rubber), such material stretching along in the direction of sawing so that it may be placed against the workpiece and running out from the guide plate away from the guide ridge and having its outer edge lined up with the line of cutting on the workpiece.

On designing the guide plate in this way it is possible to make certain on the one hand that the forces acting from the direction of sawing of the saw by way of the ridge on the guide plate are not responsible for any swiveling or rocking of the guide plate, because same may be placed fully on the work on both sides of the ridge, while on the other hand the user is safeguarded against flying chips or splinters and the face of the workpiece is safeguarded as well inasfar as the guide lip of the guide plate is in effect at the line of cutting on the workpiece, which is the same as saying that the saw blade is running against the guide lip.

In the case of guide plates designed for long and flat workpieces a useful effect is produced if the ledge is designed to run along the direction of sawing and has more or less the same breadth as the ridge. In this respect it is possible for the ledge to be placed on the one side of the guide ridge and the guide plate with the guide lip to be placed on the other side thereof.

In keeping with a further part of the invention the support or work face of the ledge is slip-proof and its top surface is made of a material with a low coefficient of friction. This is responsible at one and the same time for giving a better connection between the guide plate and the workpiece and for a better guide effect of the guide means on the guide plate.

As part of a still further idea forming part of the present invention the guide lip nearest the saw blade and placed on the main body of the guide plate is a part of an elastically designed or springing rail on the guide plate, the work face thereof being at a slope in relation to the work face of the guide plate so that the guide lip nearest the saw blade is running out from the work face of the guide plate towards the work at a slope. This may be made possible for example by fixing the spring rail in a hollow in the lower side of the guide plate with the top limiting face running from the inside towards the outside and downwards. These measures are more specially responsible for the useful effect that the two lengthways or long edges (outer edges) of the guide plate may be firmly and fully rested on the workpiece.

In keeping with a further part of the invention the outwardly running part of the rail is designed as a splinter guard with the outer edge of the rail being able to be used for marking the position of the cut so that there is now no need for the cut line to be scribed on the workpiece because the user is able to see from the outer edge where the saw blade is to be moved.

The guide ridge may be produced with a rectangular cross section, this giving on the one hand a good guiding effect of the guide means on the guide plate while on the other hand the two parts only have to be moved in one direction, that is to say in the direction of cutting, in relation to each other, As part of a further feature of the invention of special value, the guide ridge is slotted at its work face and may be joined with an angle measuring means that may for example be in the form of a half-circular protractor on whose long edge there is a lug running generally parallel to the protractor and away therefrom and there is furthermore a lug bent out of the plane of the protractor (that may have a hole therein), the distance between the same and the half-circular outer edge of the protractor being more or less the same right the way along, and which may have a curved slot centered on the hole. In this respect it is possible for the angle measuring means to be joined to the guide lip by screws running through the hole and the slot so that the angle measuring means may be moved along the guide lip. Such a design gives the useful effect that if desired a number of guide plates may be joined together by using a fastening element in the guide ridges of the two guide plates that are to be put together, said element being joined to the two guide plates. By having the angle measuring or angle adjusting means on the guide plate the cutting means used and more specially the angle of the line of cut may be very simply and exactly adjusted.

It is possible to have at least one hole in the end part of the guide plate for hanging up the plate so that it may be simply and readily stored, this more specially being useful in the case of long saw guides that are not so frequently used.

The work faces of the guide may be made of strips of separate facing material as for example synthetic resin, such strips being kept in place between keeper ridges on the underside of the guide plate. It this respect it is possible for the middle part of the guide plate to be free and uncovered in a downward direction and to be free of any strips. Such ridges give the more specially useful effect of guarding the strips and more specially the long edges thereof and because of this the strips are kept in the desired positions. If nevertheless one of the strips made of synthetic resin material comes to be damaged, a new one may simply be put in its place and it is not necessary, as in the prior art, for the complete work face to replaced if only a part of it is damaged.

A detailed account will now be given of working examples of the invention using the figures herein.

DETAILED ACCOUNT OF WORKING EXAMPLES OF THE INVENTION

Figure 1:
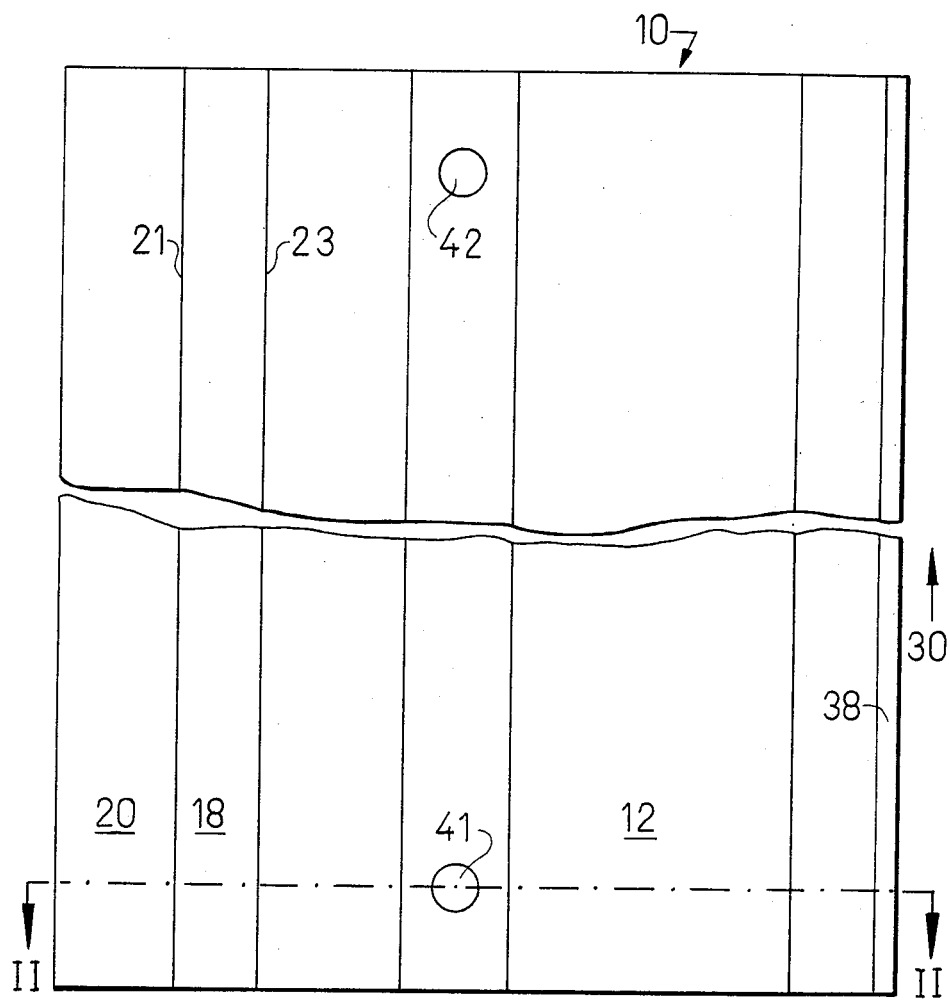
FIG. 1 is a top plan view looking straight down onto a guide plate in keeping with the teachings of the present invention.
Figure 2:
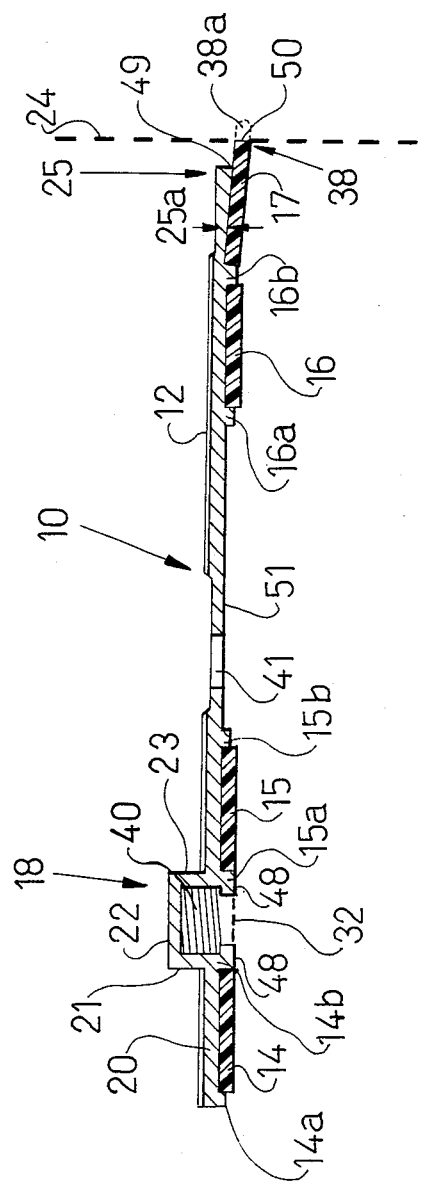
FIG. 2 is a section taken on the line II—II of FIG. 1.

In FIGS. 1 and 2 the reader will see a guide plate that is generally numbered 10 for a power hand saw 80 having guide means 82 designed for functioning with the guide plate. The guide plate 10 has a plate member with a topside or saw face 12 with a low coefficient of friction and a bottom side with an anti-slip or frictional support face or work face 14, 15, 16 and 17. The guide plate or plate member thereof, has a guide ridge 18 running along in the direction of sawing 30 and having guide faces 21 and 23 on the two sides thereof. On the guide ridge 18 there is at least one ledge 20 running out to the left, that is to say in a direction opposite to the direction of the greater part of the guide plate relative to the ridge, said ledge having the work face 14 in one and the same plane as the work face 15 and 16 of the guide plate 10. This plane is, in the present working example, further down than the work face 48 of the guide ridge 18 on a bottom side thereof. The ridge may be so far down that the lower or work face thereof is at least generally at the same level as the plane of the work face 15 and 16, and in the present case is higher up than it. However the work face 48 of the guide ridge 18 may be in generally the same plane as the work face of the guide plate 10. On the other side of the guide plate 10 to the guide ridge 18 thereof there is a guide lip 38 running in the direction of sawing and able to be placed against the workpiece (not shown). The guide lip 38 may be made of a non-cleaving (non-splitting) elastic material as for example hard rubber, running out from the level of the guide plate 10 towards the guide ridge 18 so that its outer edge 50 is at the line of cut on the workpiece, the parts being so placed that the guide lip 38 is touching the saw blade or cutting plane 24; in other words, there is no gap between the saw blade plane 24 and the guide lip 38. The saw blade is shown at 84 in FIG. 2. The outer edge 50, that is to be able for be placed firmly and flatly against the workpiece (not shown in the figures), has on the one hand the function of stopping damage to the workpiece while in the other hand cutting down the amount of chips or shavings sent flying upwards towards the user. It is simple to put the outer edge 50 in contact with the saw blade plane 24 by changing the breadth of the guide lip 38 to be somewhat greater than it was in the first place and is running into the line of cut the saw blade plane 24.

Then the first time the guide plate 10 is used, the outwardly running part 38a is to be cut back somewhat so that the saw blade plane 24 will be touching the outer edge 50 of the guide lip 38 every time a cut is made with the saw.

The ledge 20 will be seen to be running along in the direction of sawing 30 and is generally as wide as the guide ridge 18. It is further to be seen from the figures that the ledge 20 is placed on the one side of the guide ridge 18 and the main body of the guide plate 10 as such with the guide lip 38 is placed on the other side thereof. The work face 14 of the ledge has anti-slip properties and its top face is made of a material with a low coefficient of friction.

The guide lip 38, placed near the saw blade, of the guide plate 20 is a part of a springing or elastic blade 25 on the guide plate 10. The springing effect is produced inasfar as the lip 38 is made less strong at 25a. The work face 17 of the elastic blade 25 is placed at a slope in relation to the work face of the guide plate 10 so that the guide lip 38, next to the saw blade 24 will be placed at a slope and running downwards from the work face of the guide plate 10 towards the workpiece. This may be made possible for example by the elastic blade 25 having a hollow or pocket in the lower side of the guide plate 10, the top limit of such pocket running outwards and downwards. This pocket 49 takes up the work face 17, that may be made for example of hard rubber, that is to say a non-cleaving material, that is kept in place by adhesive for example. The elastic blade 25 is placed running along in the direction of cutting and the guide lip 38 has the function of marking the position of the cut made.

The work face of the guide plate 10 is in the main made up of strips 14, 15, 16 and 17, same be produced form synthetic resin material with ribs or ridges 14a, 15b, 15a, 15b 16a and 16b on the lower side of the guide plate 10 to keep them in place. The middle part 51 of the guide plate 10 is free of resin covering. The function of the keeping or keying ridges 14a, 15b, 15a, 15b 16a and 16b is that of guarding the work side of the guide face 10.

For hanging up and storing the guide plate 10 there are holes 41 and 42 in the axial end parts of the guide plate.

Figure 4:
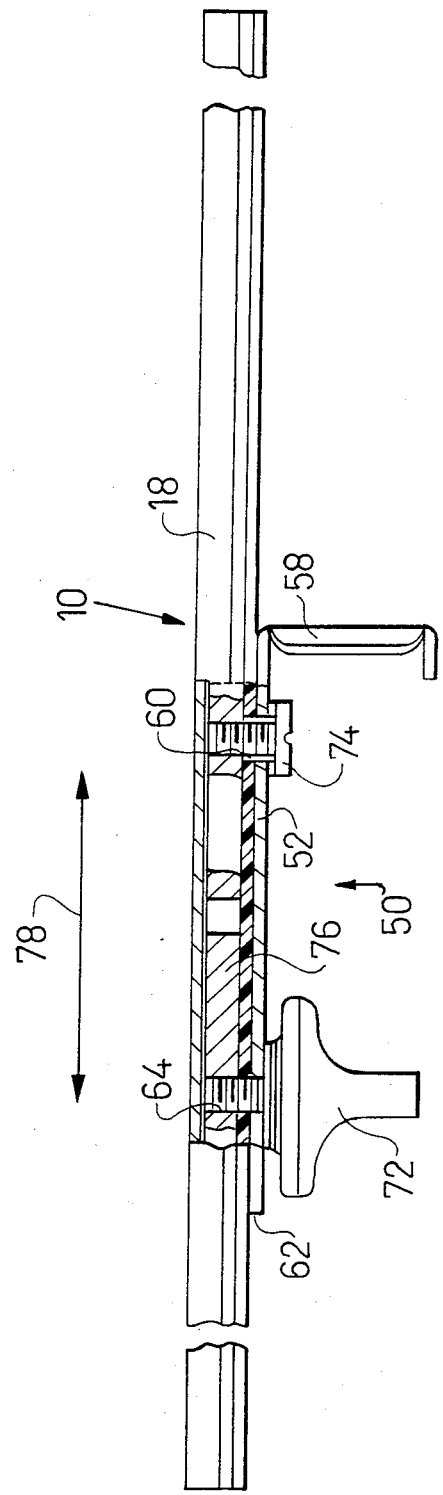
FIG. 4 is a view of a guide plate with an angle measuring means as seen from the side and partly in section.

At its work face the guide ridge 18 is slotted at T-shaped groove or slot 32 so that at least two such guide plates may be joined together by connection pieces 40, this making it possible for the saw to be guided on a piece of work that is very much longer than a single guide plate. There is furthermore the useful effect with such a slot 32 that the guide plate may be joined up at its guide ridge 18 with another tool part as for example with an angle measuring means (see FIG. 4). This is more specially of value if for example the line of cut and one of the outer edges of the work are to have a given, adjusted for angle between them.

Figure 3:
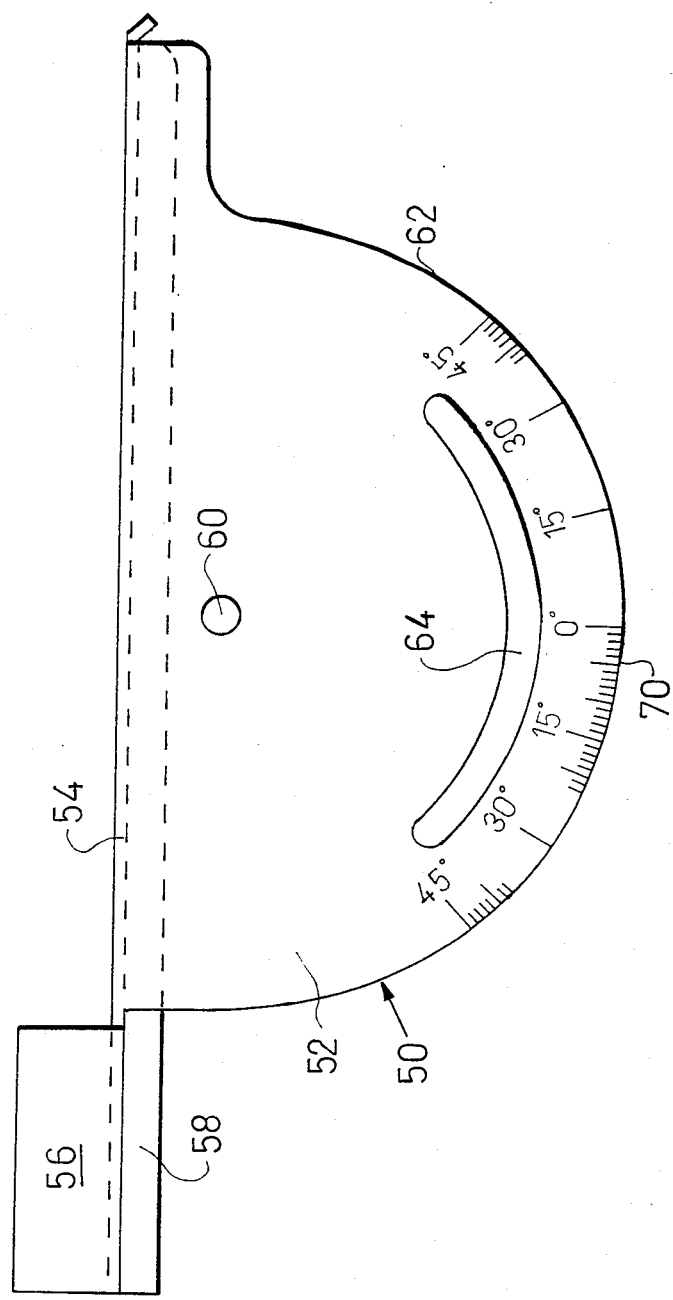
FIG. 3 is a bottom plan view looking straight up on an angle adjusting or measuring part.

In FIG. 3 the reader will see an angle measuring or adjusting means 50 in the form of a flat half-circle protractor 52, on whose long edge 54 there is lug 56 running out generally parallel to the protractor 52 and away therefrom. There is furthermore a lug 58 bent out of the plane of the protractor. The angle measuring means 50 has a hole 60 in it at the center of curvature of the outer edge 62 of the protractor 52. The protractor furthermore has a part-circular slot 64 centered on the hole 60. At the outer edge 62 over the slot 64 there is a scale 70 for reading off the angles. The angle measuring means 50 is, as may be seen from FIG. 4, able to be fixed in place on the guide ridge 18 of the guide plate by way of screws 72 and 74 and a retainer or gripping part 76. The angle measuring means is turningly joined up with the guide plate 10, the pivot point there being formed by the screw 74. The screw 72 is only to be done up tight when adjustment to the desired angle, as read off from the scale 70, has been made. The angle measuring means 50 is able to be slid in plate 10 in the direction of the two-headed arrow 78 and may be fixed and taken off the guide plate 10 when desired.

All in all the guide plate of the present invention is responsible for a number of different useful effects, that is to say: because of the anti-slip workpiece face the guide plate may be firmly and flatly kept in place on the work, it is not possible for the plate to be rocked out of the desired position, because the forces produced by the saw are taken up by the ridge and, for this reason, by the guide plate. The adjustment to be on the line of cutting may be exactly made and kept to, because the guide lip may be placed right up against the line of cut on the workpiece without any space therebetween. There is no damage to the face of the workpiece, because the guide lip is in contact with this part of the workpiece. Last but not least, there is the useful effect that there is no gap between the guide lip and the saw blade. It will be seen from this that it is not possible for the saw body to come into contact with the workpiece so that the last-named will not be damaged. The heavy weight of the body of the saw is at a higher level than the guide plate and is not to the side of it, as is the case with main known systems.

I claim:

1. A hand power saw guide plate comprising:
    a plate member having a low friction top surface adapted to slidably receive a hand power saw, a bottom surface adapted to face a workpiece to be cut along a cutting line, and a first edge adapted to be adjacent the cutting line;
    anti-slip means connected to said plate member and covering at least a portion of said bottom surface for establishing a frictional support work-face in a work-face plane for engagement with a workpiece;
    a guide lip made of non-splitting elastic material connected to said bottom surface of said plate member and extending over and beyond said first edge and over a position of the cutting line whereby an outer portion of said guide lip can be cut from said guide lip along the cutting line to leave an outer edge on said guide lip; and
    biasing means associated with said guide lip for biasing said guide lip downwardly beyond said work-face plane for elastically engaging a workpiece to be cut.

2. A guide plate according to claim 1, wherein said biasing means comprises a springy blade connected to said plate member and defining said first edge of said plate member, said springy blade having a lower weakening area of reduced thickness for resiliently moving said first edge of said plate member downwardly with respect to said work-face plane, said springy blade engaged on and over said guide lip.

3. A guide plate according to claim 2, wherein said springy blade has a lower surface engaged with said guide lip extending at an angle to said work-face plane and downwardly with respect thereto in an outward direction from said first edge to a location of the cutting line.

4. A guide plate according to claim 1, wherein said biasing means comprises said plate member having a recess area in said bottom surface thereof which is inclined downwardly and outwardly with respect to said work-face plane and said first edge, said recess area receiving and in engagement with said guide lip.

5. A guide plate according to claim 1, wherein said anti-slip means comprise a plurality of strips of anti-slip material connected to said bottom surface of said plate member and extending parallel to said first edge, said strips being spaced apart in a direction transverse to the direction of said first edge, said strips being made of non-skid synthetic material.

6. A guide plate according to claim 5, wherein said plate member includes a plurality of ribs extending downwardly from said bottom surface and defining grooves, each strip disposed in one of said grooves.

7. A guide plate according to claim 6, wherein said plate member includes a central raised area which is disposed upwardly from said work-face plane, said ribs and strips extending downwardly from said central area with at least one strip on one side of said central area with respect to said first edge and at least one strip on an opposite side of said central area with respect to said first edge.

8. A guide plate according to claim 1, wherein said plate member includes a raised ridge on said top surface thereof, said ridge defining a slot extending parallel to said first edge and defining guide surfaces on opposite lateral sides thereof extending parallel to said first edge.

9. A guide plate according to claim 7 comprising:
a plate member having a low friction top surface adapted to slidably receive a hand power saw, a bottom surface adapted to face a workpiece to be cut along a cutting line, and a first edge adapted to be adjacent the cutting line;
anti-slip means connected to said plate member and covering at least a portion of said bottom surface for establishing a frictional support work-face in a work-face plane for engagement with a workpiece;
a guide lip made of non-splitting elastic material connected to said bottom surface of said plate member and extending over and beyond said first edge and over a position of the cutting line whereby an outer portion of said guide lip can be cut from said guide lip along the cutting line to leave an outer edge on said guide lip; and
biasing means associated with said guide lip for biasing said guide lip downwardly beyond said work-face plane for elastically engaging a workpiece to be cut, said biasing means comprising a springy blade connected to said plate member and carrying said first edge thereof, said springy member having a recessed area and said bottom surface of said plate member which is inclined downwardly and outwardly with respect to said work-face plane and said first edge, said recessed area engaged with said guide lip.

10. A guide plate according to claim 9, including angle adjustment means connected to said plate member, said angle adjustment means comprising a half-circle protractor with a lengthwise edge adapted to extend at a selected angle with respect to said first edge of said plate member, said adjustment means including a retainer extending in said slot of said ridge, said slot being a T-shaped slot, said adjustment means including connectors connected between said protractor and said retainer, said protractor including at least one lug extending downwardly from said work-face plane for engaging a workpiece.

11. A guide plate according to claim 20, wherein said protractor includes at least one hole therethrough at a center of curvature of a half-circle portion of said protractor, and an arcuate slot spaced from said center, said fastening means including screws extending through said opening and through said slot and to said retainer.

* * * * *